(12) United States Patent
Kang et al.

(10) Patent No.: US 9,268,544 B2
(45) Date of Patent: Feb. 23, 2016

(54) METHOD FOR DEVELOPING SOFTWARE AND APPARATUS FOR THE SAME

(75) Inventors: Kyo-Chul Kang, Gyeongbuk (KR); Hye-Sun Lee, Gangwon-Do (KR); Jin-Seok Yang, Gyeongbuk (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 127 days.

(21) Appl. No.: 13/502,480

(22) PCT Filed: Oct. 18, 2011

(86) PCT No.: PCT/KR2011/007751
§ 371 (c)(1),
(2), (4) Date: Apr. 17, 2012

(87) PCT Pub. No.: WO2012/067351
PCT Pub. Date: May 24, 2012

(65) Prior Publication Data
US 2012/0240100 A1   Sep. 20, 2012

(30) Foreign Application Priority Data
Nov. 18, 2010   (KR) .................. 10-2010-0115218

(51) Int. Cl.
*G06F 9/44*   (2006.01)
*G06F 9/445*  (2006.01)

(52) U.S. Cl.
CPC ...................... *G06F 8/54* (2013.01)

(58) Field of Classification Search
CPC ........................................................ G06F 8/54
USPC ........................................................ 717/106
See application file for complete search history.

(56) References Cited

U.S. PATENT DOCUMENTS

| | | | |
|---|---|---|---|
| 7,243,334 B1* | 7/2007 | Berger et al. ................. | 717/109 |
| 2004/0153992 A1* | 8/2004 | Molina-Moreno et al. ... | 717/105 |
| 2007/0028208 A1* | 2/2007 | Maki ............................. | 717/106 |
| 2011/0063296 A1* | 3/2011 | Bolz et al. .................... | 345/426 |

\* cited by examiner

*Primary Examiner* — Li B Zhen
*Assistant Examiner* — Sen Chen
(74) *Attorney, Agent, or Firm* — Osha Liang LLP

(57) ABSTRACT

Provided is software product line-based software development method using a software type automatic code generator, and an apparatus for the same. The method includes selecting features corresponding to software from a developer from a feature model created by analyzing features of multiple software to generate feature lists, determining an automatic code generator corresponding to a software type received from the developer, selecting architecture components using the software type, generating automatically generated code on the basis of the selected architecture components and requirements of the determined automatic code generator received from the developer, modifying the automatically generated code and code of the architecture components on the basis of the generated feature list to output configured code, and connecting a part calling a library of domains in the configured code with a part calling an actual domain library to generate final generation code.

10 Claims, 4 Drawing Sheets

METHOD FOR DEVELOPING SOFTWARE AND APPARATUS FOR THE SAME

TECHNICAL FIELD

The present invention relates to a method for developing software and an apparatus for the same, and more particularly, to a software product line-based software development method using a software type-specific automatic code generator and an apparatus for the same.

BACKGROUND ART

An automatic code generator varies according to a type of software to be developed. Here, software types are classified according to the role of the software. For example, software that stores and manages data is a data manager software type, and software that converts a data value received from a data sender into another data value according to a data transformation rule is a data converter software type.

Also, software that transmits data received from a data sender to a data receiver according to a data distribution rule is a data distributor software type, software that manages a state of a system is a controller software type, and software that reads and shows data to a user as an interface between the user and a system is a monitor software type.

When software type-specific automatic code generators are defined and developed, several pieces of software of different software types can be developed using automatic code generators of the corresponding software types.

Also, when software needs to be developed using an automatic code generator, if there is an existing automatic code generator of the same software type as the software to be developed, the existing automatic code generator can be modified and reused.

However, existing single or product line-based software development methods using an automatic code generator all assume one type of automatic code generator. Thus, in the existing methods, it is difficult to develop several pieces of software of different software types using an automatic code generator.

In addition, when software needs to be developed using an automatic code generator, if there is existing automatic code, it is difficult to determine whether the existing automatic code generator can be reused for development of the software to be developed.

DISCLOSURE

Technical Problem

The present invention is directed to providing a software product line-based software development apparatus using a type-specific automatic code generator.

The present invention is also directed to providing a software product line-based software development method using a type-specific automatic code generator.

Technical Solution

One aspect of the present invention provides an apparatus for developing software including: a feature selector configured to select a feature corresponding to development-subject software received from a developer from a feature model created by analyzing features of multiple software, and generate a feature list; an automatic code generator selector configured to determine an automatic code generator corresponding to a development-subject software type received from the developer; an automatic code generator configured to select architecture components of the development-subject software using the development-subject software type, and generate automatically generated code on the basis of the selected architecture components and requirements of the determined automatic code generator received from the developer; a configurator configured to modify the automatically generated code and code of the architecture components on the basis of the generated feature list, and output configured code; and a linker configured to connect a part calling a library of a domain in the configured code with a part calling an actual domain library, and generate final generation code.

Another aspect of the present invention provides a method for developing software including: selecting features corresponding to development-subject software received from a developer from a feature model created by analyzing features of multiple software, and generating a feature list; determining an automatic code generator corresponding to a development-subject software type received from the developer; selecting architecture components of the development-subject software using the development-subject software type, and generating automatically generated code on the basis of the selected architecture components and requirements of the determined automatic code generator received from the developer; modifying the automatically generated code and code of the architecture components on the basis of the generated feature list, and outputting configured code; and connecting a part calling a library of a domain in the configured code with a part calling an actual domain library, and generating final generation code.

Advantageous Effects

When a method and apparatus for developing software using a software type-specific automatic code generator on the basis of a software product line according to an exemplary embodiment of the present invention as described above are used, it is possible to develop several pieces of software of different software types using the corresponding software type-specific automatic code generators.

Also, when software of the same software type as a software type-specific automatic code generator, which has been developed already, is developed using an automatic code generator in a product line-based software development method, the software type-specific automatic code generator can be modified and reused.

MODES OF THE INVENTION

Figure 1:
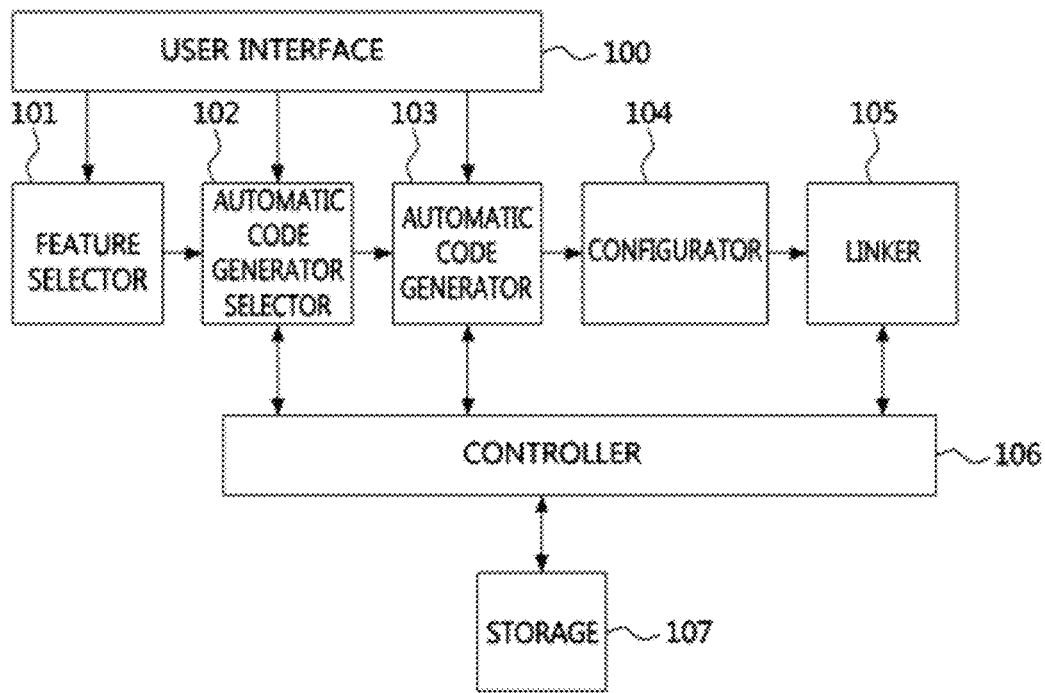
FIG. 1 is a block diagram schematically showing an internal structure of an apparatus for developing software according to an exemplary embodiment of the present invention.

While the invention is susceptible to various modifications and alternative forms, specific embodiments thereof are shown by way of example in the drawings and will herein be described in detail. However, it should be understood that there is no intent to limit the invention to the particular forms disclosed, but on the contrary, the invention is to cover all modifications, equivalents, and alternatives falling within the spirit and scope of the invention. Like numbers are used for like elements throughout the description of the drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms and used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to accompanying drawings.

Prior to the present invention, a general software development method will be described. First, a software development method based on a software product line will be described. In the software product line-based software development method, pieces of software are not individually developed, but pieces of software providing similar services are considered and developed together.

In other words, with functional aspects and quality of several pieces of software belonging to the same domain taken into consideration, enough main properties are secured through analysis of common and different points, and combined to develop desired software. In the software product line-based software development method, common assets can be reused to shorten a development period and improve productivity, and high quality software can be developed.

Second, a software development method using an automatic code generator will be described. There are several software development methods based on a software product line, and one of them is the software product line-based software development method using an automatic code generator.

An automatic code generator is a system that automatically generates source code of software from a model, and can reduce manpower, cost, and time required for software development and increase productivity of software, compared to a case where a person manually develops source code.

Third, a software product line-based software development method using an automatic code generator will be described. A single software development method using an automatic code generator has been researched in various software domains.

However, a single software development method using an automatic code generator aims for single software development, and thus is difficult to apply to software product line-based software development. There is research on software product line-based software development using an automatic code generator.

However, the existing research does not clearly disclose in detail what systems are combined in what way for software product line-based software development using an automatic code generator, and through what process product line-based software development is achieved. An internal structure of an apparatus for developing software according to an exemplary embodiment of the present invention will be described in detail below with reference to FIG. 1.

FIG. 1 is a block diagram schematically showing an internal structure of an apparatus for developing software according to an exemplary embodiment of the present invention.

Referring to FIG. 1, the apparatus for developing software may include a user interface 100, a feature selector 101, an automatic code generator selector 102, an automatic code generator 103, a configurator 104, a linker 105, a controller 106 and a storage 107. The storage 107 may include an automatic code generator storage (not shown), an architecture model storage (not shown) and a domain library storage (not shown).

The user interface 100 transfers inputs and outputs between a developer, who performs product line-based software development using a software type-specific automatic code generator, and the feature selector 101, between the developer and the automatic code generator selector 102, between the developer and the automatic code generator 103, between the developer and the configurator 104, and between the developer and the linker 105.

The feature selector 101 receives features corresponding to software to be developed from the developer through the user interface 100 on the basis of a feature model, which is created by analyzing commonality and variability of multiple software belonging to a software product line in terms of features, and generates a list of the features.

Here, the feature model is created by analyzing common features, which are commonly included in the multiple software belonging to the software product line, and variable features, which are included or not included in the multiple software belonging to the software product line.

The automatic code generator selector 102 receives a software type to be developed among a plurality of software types included in a software type list from the developer through the user interface 100, and selects an automatic code generator corresponding to the received software type to be developed from the automatic code generator storage by control of the controller 106.

For example, the automatic code generator selector 102 may receive a data manager software type, a data converter software type, a data distributor software type, a controller software type and a monitor software type, which are software types to be developed, among the plurality of software types included in the software type list from the developer through the user interface 100, and the software types that can be received from the developer are not limited to these.

In an exemplary embodiment of the present invention, the data manager software type indicates software that stores and manages data, receiving requests for data read, write, deletion, etc. from the outside, accessing a database to process the received requests for data read, write, deletion, etc., and performing processes such as data read, write and deletion. The data converter software type indicates software that converts data received from a data sender into other data values according to a data transformation rule.

In an exemplary embodiment of the present invention, the data distributor software type indicates software that transmits data received from a data sender to a data receiver according to a data distribution rule. The controller software type indicates software that manages a state of a system, carrying out a predetermined action according to a current situation. The monitor software type indicates software that reads and shows data to a user as an interface between the user and a system.

In an exemplary embodiment of the present invention, software may have at least two software types. For example, software having the data converter software type and the data distributor software type converts data received from a data sender into other data values according to a data transformation rule, and transmits the data values to a data receiver according to a data distribution rule.

The automatic code generator 103 selects architecture components of the software to be developed from the architecture model storage using the software type to be developed by control of the controller 106, receives requirements of the automatic code generator selected by the automatic code generator selector 102 from the developer through the user interface 100, and generates automatically generated code corresponding to the software type to be developed.

In an exemplary embodiment of the present invention, the requirements of the automatic code generator selected by the automatic code generator selector 102 are received from the developer through the user interface 100, and the received requirements of the automatic code generator may include a part modified and a part configured according to the list of the features selected by the feature selector 101.

In an exemplary embodiment of the present invention, the requirements of the automatic code generator selected by the automatic code generator selector 102 vary depending on at least one automatic code generator selected from among a data converter software-type automatic code generator, a data distributor software-type automatic code generator, a controller software-type automatic code generator and a data converter+data distributor software-type automatic code generator according to a software type.

Here, an automatic code generator corresponding to a software type is not limited to the description of the present invention, and a software type-specific automatic code generator may be defined for another software type. The present invention can be implemented in various different forms, and is not limited to examples described herein.

The configurator 104 modifies the part modified and the part configured according to the feature list in the automatically generated code generated by the automatic code generator 103 and code of the architecture components of the selected software to be developed according to the feature list selected by the feature selector 101, thereby outputting configured code.

Here, the configured code does not have the parts to be modified and configured according to the feature list selected by the feature selector 101, but includes a part that calls an available domain library. The linker 105 connects the part calling the domain library in the code configured by the configurator 104 with a part calling an actual domain library selected from the domain library storage by control of the controller 106, thereby generating final generation code.

The automatic code generator storage stores automatic code generators corresponding to software types that have been already developed. The architecture model storage stores software architecture models corresponding to software types. The domain library storage stores libraries used in software domains.

When the automatic code generator selector 102 receives the software type to be developed among the plurality of software types included in the software type list from the developer through the user interface 100 and selects an automatic code generator, the controller 106 controls the automatic code generator corresponding to the software type, which is to be developed and is received from the developer through the user interface 100, to be selected from the automatic code generator storage.

When the automatic code generator 103 selects the architecture components of the software to be developed using the software type to be developed, the controller 106 controls the architecture components of the software to be developed to be selected from the architecture model storage. Also, when the linker 105 connects the part calling the domain library in the configured code with a part calling an actual domain library, the controller 106 controls the part calling the actual domain library selected from the domain library storage to be selected.

Requirements of an automatic code generator selected by the automatic code generator selector 102 of an apparatus for developing software according to an exemplary embodiment of the present invention will be described in detail below with reference to FIGS. 2 to 5.

Figure 2:
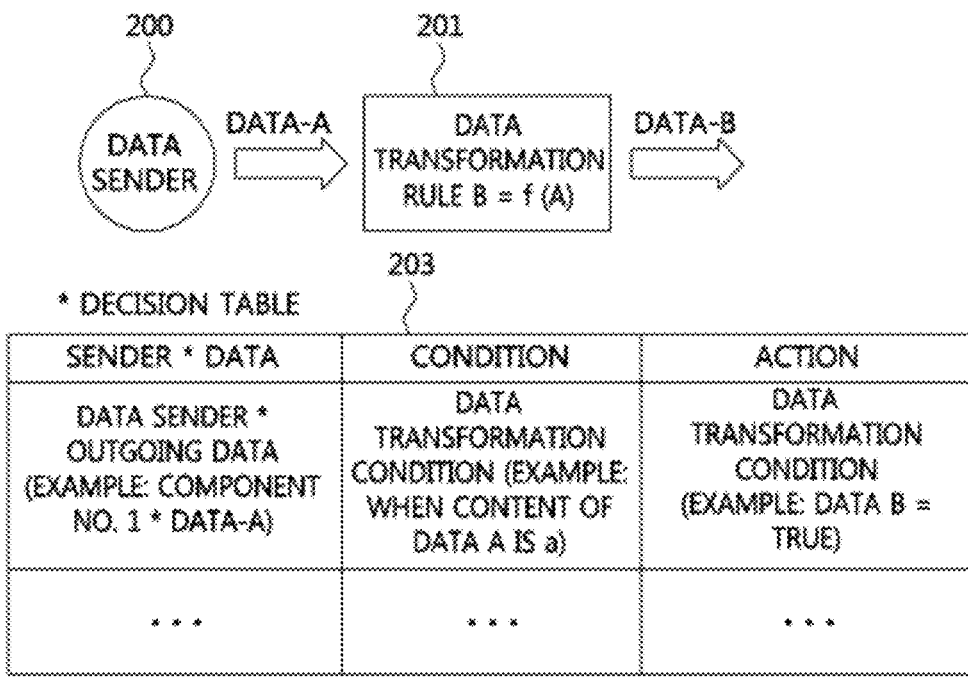
FIG. 2 is an example diagram showing requirements of a data converter software-type automatic code generator selected by an automatic code generator selector of an apparatus for developing software according to an exemplary embodiment of the present invention.

FIG. 2 is an example diagram showing requirements of a data converter software-type automatic code generator selected by an automatic code generator selector of an apparatus for developing software type-specific software according to an exemplary embodiment of the present invention.

Referring to FIG. 2, when data converter software-type software receives data-A from a data sender 200, the received data-A is converted into data-B according to a data transformation rule 201 for a case where, for example, content of the received data-A is a. Such a relationship can be shown in a decision table 203 having respective columns of Data Sender * Data, Transformation Condition, and Action. The automatic code generator 103 may automatically generate automatically generated code of the data converter software-type software using the decision table 203.

Figure 3:
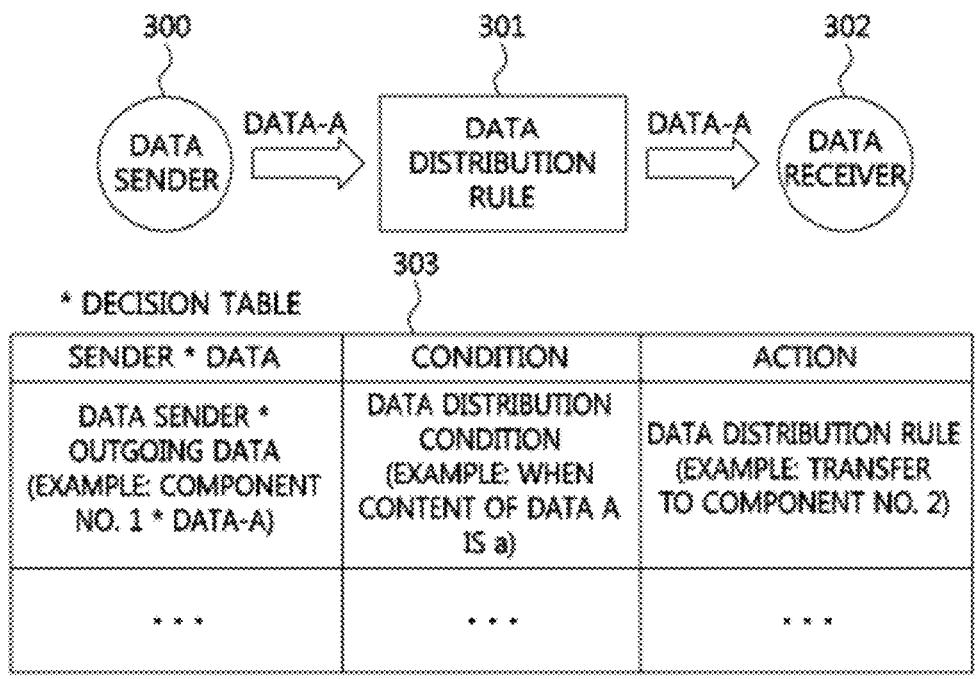
FIG. 3 is an example diagram showing requirements of a data distributor software-type automatic code generator selected by an automatic code generator selector of an apparatus for developing software according to an exemplary embodiment of the present invention.

FIG. 3 is an example diagram showing requirements of a data distributor software-type automatic code generator selected by an automatic code generator selector of an apparatus for developing software type-specific software according to an exemplary embodiment of the present invention.

Referring to FIG. 3, when data distributor software-type software receives data-A from a data sender, the received data-A is transferred to a data receiver 302 according to a data transformation rule 301 for a case where, for example, content of the received data-A is a. Such a relationship may be shown in a decision table 303 having respective columns of Data Sender * Data, Condition, and Action. The automatic code generator 103 may automatically generate automatically generated code of the data distributor software-type software from the decision table 303.

Figure 4:
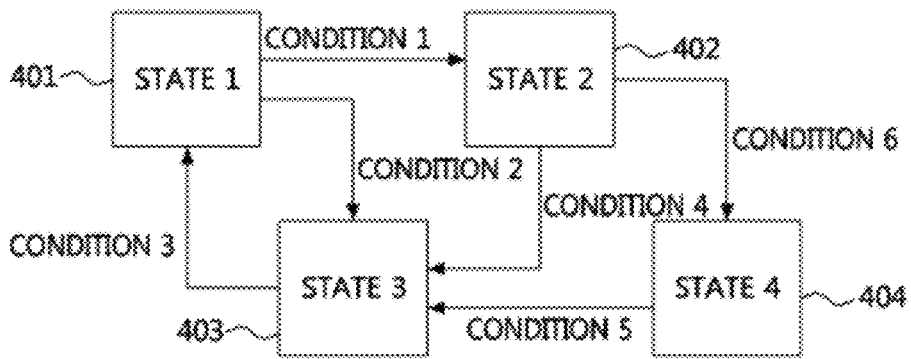
FIG. 4 is an example diagram showing requirements of a controller software-type automatic code generator selected by an automatic code generator selector of an apparatus for developing software according to an exemplary embodiment of the present invention.

FIG. 4 is an example diagram showing requirements of a controller software-type automatic code generator selected by an automatic code generator selector of an apparatus for developing software type-specific software according to an exemplary embodiment of the present invention.

Referring to FIG. 4, controller software-type software controls several states of a system. For example, when there are conditions that can occur in each state of a system and a condition that can occur is satisfied, the controller software-type software calls a function or switches to another state.

In an exemplary embodiment of the present invention, the controller software-type software manages state 1 401 to state 4 404 of the system. The controller software-type software switches from state 1 401 to state 2 402 when the system is in state 1 401 and condition 1 is satisfied, switches from state 1 401 to state 3 403 when the system is in state 1 401 and condition 2 is satisfied, and switches from state 3 403 to state 1 401 when the system is in state 3 403 and condition 3 is satisfied.

Such a relationship can be shown in a Statechart converter 405 having respective columns of State, Condition, and Action. The automatic code generator 103 may automatically generate automatically generated code of the controller software-type software using the Statechart converter 405.

Figure 5:
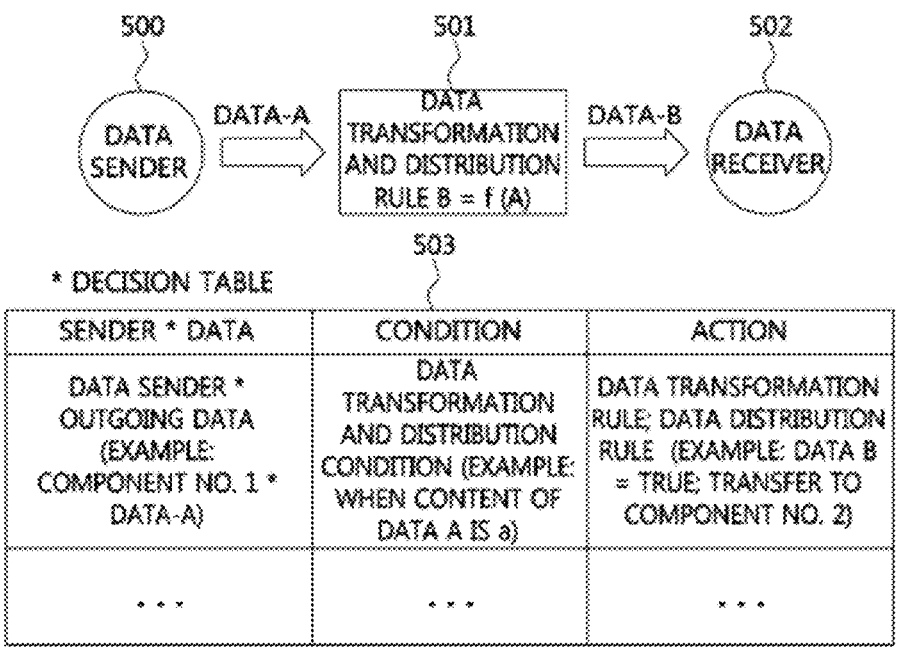
FIG. 5 is an example diagram showing requirements of a data converter+data distributor software-type automatic code generator selected by an automatic code generator selector of an apparatus for developing software according to an exemplary embodiment of the present invention.

FIG. 5 is an example diagram showing requirements of a data converter+data distributor software-type automatic code generator selected by the automatic code generator selector 102 of an apparatus for developing software according to an exemplary embodiment of the present invention.

Referring to FIG. 5, the data converter+data distributor software-type automatic code generator receives data-A from a data sender 500, converts the received data-A into data-B and transfers the converted data-B to a data receiver 502 according to a data transformation rule and data distribution rule 501.

Such a relationship may be shown in a decision table 503 having respective columns of Data Sender * Data, Condition, and Action in the form of a combination of the decision table 203 of a data converter and the decision table 303 of a data distributor.

The automatic code generator 103 may automatically generate automatically generated code of the data converter+data distributor software-type software using the decision table 503. Code that the configurator 104 modifies and adapts according to a feature list in automatically generated code and architecture components code of selected software to be developed after software skeleton code is filled with the code generated by the automatic code generator 103 of an apparatus for developing software according to an exemplary embodiment of the present invention will be described in detail below with reference to FIG. 6.

Figure 6:
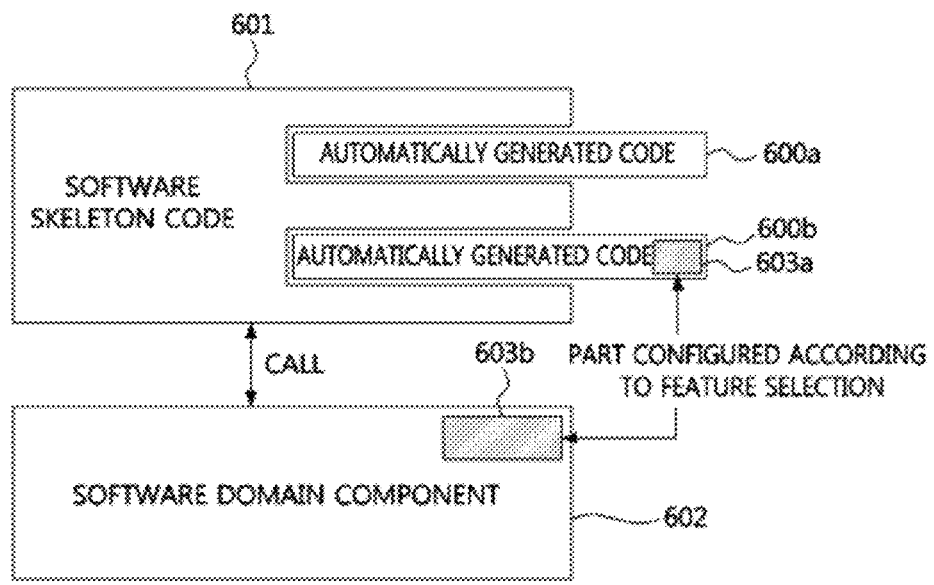
FIG. 6 is an example diagram of code that a configurator modifies and adapts according to a feature list in automatically generated code and architecture component code of selected development-subject software after software skeleton code is filled with the code generated by an automatic code generator of an apparatus for developing software according to an exemplary embodiment of the present invention.

FIG. 6 is an example diagram of code that a configurator modifies and adapts according to a feature list in automatically generated code and architecture component code of selected software to be developed after the automatic code generator 103 of an apparatus for developing software according to an exemplary embodiment of the present invention fills software skeleton code with the automatically generated code.

Referring to FIG. 6, the automatic code generator 103 selects architecture components of software to be developed from the architecture model storage using a software type to be developed by control of the controller 106, receives requirements of an automatic code generator selected by the automatic code generator selector 102 from the developer through the user interface 100, generates automatically generated code 600a and 600b corresponding to the software type to be developed, and fills unimplemented parts of domain components that are the software architecture components, for example, a software domain component 602, and software skeleton code 601 with the generated automatically generated code 600a and 600b.

The configurator 104 may modify the software skeleton code and the automatically generated code according to a feature list selected by the feature selector 101, thereby outputting configured code.

Here, the configured code may include a part that calls a domain library, and the software domain components 602 and the automatically generated code 600a and 600b may include configured code parts 603a and 603b corresponding to different points according to the feature list selected by the feature selector 101.

In software code, the configurator 104 may not include the configured code parts 603a and 603b corresponding to the different points generated by comparing the software skeleton code and the automatically generated code with the feature list selected by the feature selector 101.

The linker 105 connects the part calling the domain library in the code configured by the configurator 104 with a part calling a library of the software domain components, thereby generating final generation code.

An internal structure of software to be developed using a software product line-based software development apparatus employing a software type-specific automatic code generator according to an exemplary embodiment of the present invention will be described in detail below with reference to FIG. 7.

Figure 7:
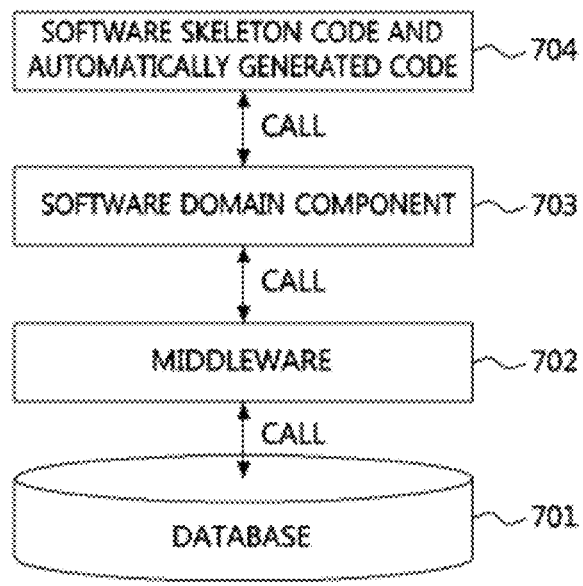
FIG. 7 is a block diagram schematically showing an internal structure of software to be developed using a software product line-based software development apparatus employing a software type-specific automatic code generator according to an exemplary embodiment of the present invention.

FIG. 7 is a block diagram schematically showing an internal structure of software to be developed using a software product line-based software development apparatus employing a software type-specific automatic code generator according to an exemplary embodiment of the present invention.

Referring to FIG. 7, a database 701 stores data, and the database 701 and middleware 702 call each other. The middleware 702 and a domain component 703 of software to be developed call each other.

The software domain component 703 is obtained by implementing a function used in common in domains of the software to be developed as a component, and the software domain component 703 and software skeleton code and automatically generated code 704 call each other.

The software skeleton code and automatically generated code 704 stores automatically generated code generated by filling an unimplemented part of software skeleton code with automatically generated code.

Here, the software skeleton code is code which is specialized to software and for which an interface is defined. In the software skeleton code, the inside of a function is not implemented, and an algorithm is not refined. The automatically generated code is code automatically generated by the automatic code generator 103 and specialized to software. A method for developing software according to an exemplary embodiment of the present invention will be described in detail below with reference to FIG. 8.

Figure 8:
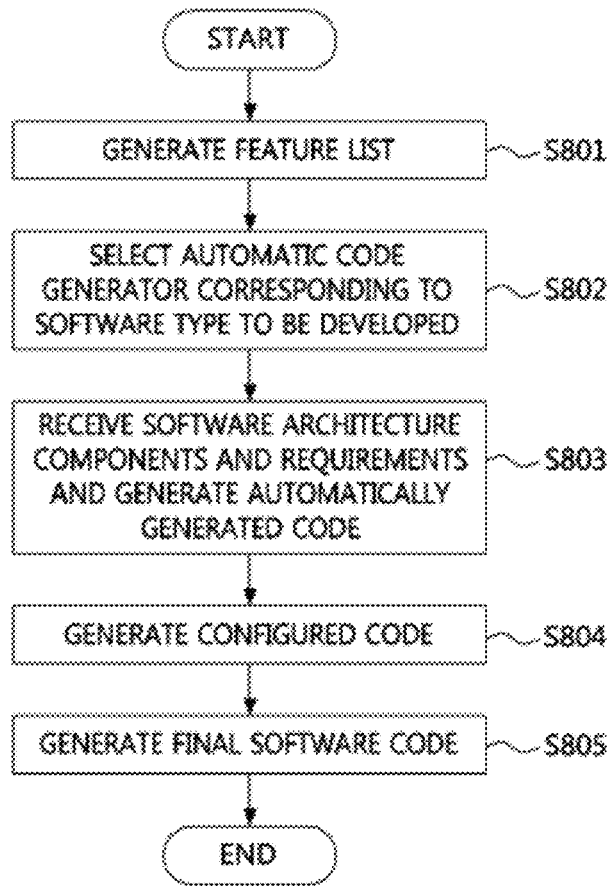
FIG. 8 is a flowchart illustrating a method for developing software according to an exemplary embodiment of the present invention.

FIG. 8 is a flowchart illustrating a method for developing software according to an exemplary embodiment of the present invention.

Referring to FIG. 8, an apparatus for developing software receives features corresponding to software to be developed from a developer on the basis of a feature model, which is created by analyzing common and different points of a multiple software belonging to a software product line, and generates a list of the features (S801).

Here, the feature model is created by analyzing common features, which are commonly included in the multiple software belonging to the software product line, and variable features, which are included or not included in the multiple software belonging to the software product line.

The apparatus for developing software receives a software type to be developed among a plurality of software types included in a software type list from the developer, and selects an automatic code generator corresponding to the received software type to be developed (S802).

The apparatus for developing software may receive a data manager software type, a data converter software type, a data distributor software type, a controller software type and a monitor software type, which are software types to be developed, among the plurality of software types included in the software type list from the developer, and the software types that can be received from the developer are not limited to these.

In an exemplary embodiment of the present invention, the data manager software type indicates software that stores and manages data, receiving requests for data read, write, deletion, etc. from the outside, accessing a database to process the received requests for data read, write, deletion, etc., and performing processes such as data read, write and deletion. The data converter software type indicates software that converts data received from a data sender into other data values according to a data transformation rule.

In an exemplary embodiment of the present invention, the data distributor software type indicates software that transmits data received from a data sender to a data receiver according to a data distribution rule. The controller software type indicates software that manages a state of a system, carrying out a predetermined action according to a current situation. The monitor software type indicates software that reads and shows data to a user as an interface between the user and a system.

In an exemplary embodiment of the present invention, software may have at least two software types. For example, software having the data converter software type and the data distributor software type converts data received from a data sender into other data values according to a data transformation rule, and transmits the data values to a data receiver according to a data distribution rule.

The apparatus for developing software receives architecture components of software corresponding to the software type to be developed and requirements of the automatic code generator from the developer, thereby generating automatically generated code corresponding to the software type to be developed (S803).

In an exemplary embodiment of the present invention, the apparatus for developing software receives the requirements of the automatic code generator selected by the automatic code generator selector 102 from the developer, and the received requirements of the automatic code generator may include a part modified and a part configured according to the feature list.

In an exemplary embodiment of the present invention, the requirements of the automatic code generator received from the developer vary depending on at least one automatic code generator selected from among a data converter software-type automatic code generator, a data distributor software-type automatic code generator, a controller software-type automatic code generator and a data converter+data distributor software-type automatic code generator according to a software type.

Here, an automatic code generator corresponding to a software type is not limited to the description of the present invention, and a software type-specific automatic code generator may be defined for another software type. The present invention can be implemented in various different forms, and is not limited to examples described herein.

The apparatus for developing software modifies the part modified and the part configured according to the feature list in the automatically generated code and code of the architecture components of the software to be developed according to the feature list, thereby outputting configured code (S804).

Here, the configured code does not have the parts to be modified and configured according to the feature list, but includes a part that calls an available domain library. The apparatus for developing software connects the part calling the domain library in the configured and output code with a part calling an actual domain library, thereby generating final software code (S805).

While the invention has been shown and described with reference to certain exemplary embodiments thereof, it will be understood by those skilled in the art that various changes in form and details may be made therein without departing from the spirit and scope of the invention as defined by the appended claims.

The invention claimed is:
1. An apparatus for developing software, comprising:
a processor,
a memory, and
a storage configured to separately store a plurality of previously developed automatic code generators, a plurality of software architecture components, and libraries used in a software domain according to software types,
wherein the processor executes a program code which is stored in the memory and comprises:

a feature selector configured to select a feature corresponding to development-subject software received from a developer from a feature model created by analyzing features of multiple software, and generate a feature list;

an automatic code generator selector configured to determine an automatic code generator corresponding to at least one development-subject software type received from the developer;

an automatic code generator configured to select architecture components of the development-subject software using the at least one development-subject software type, and generate automatically generated code on the basis of the selected architecture components and requirements of the determined automatic code generator received from the developer;

a configurator configured to modify the automatically generated code and code of the architecture components on the basis of the generated feature list, and output configured code;

a linker configured to connect a part calling a library of a domain in the configured code with a part calling an actual domain library, and generate final generation code, and a controller configured to control the automatic code generator corresponding to the development-subject software type received from the developer to be selected from among the plurality of previously developed automatic code generators stored in the storage accordingly to software types, wherein the at least one development-subject software type includes at least one of a data manager software type, a data converter software type, a data distributor software type, a controller software type, and a monitor software type, wherein the feature model is created by analyzing commonality and variability of multiple software belonging to a software product line in terms of features, wherein the controller controls the part calling the actual domain library which is connected with the part calling the library of the domain in the configured code to be selected from among libraries stored in the storage, and wherein the data manager software type indicates software that stores and manages data, receives requests for data read, write, and deletion from outside, accesses a database to process the received requests, and performs processes for the received requests, the data converter software type indicates software that converts data received from a data sender into other data values according to a data transformation rule, the data distributor software type indicates software that transmits data received from a data sender to a data receiver according to a data distribution rule, the controller software type indicates software that manages a state of a system, and carries out a predetermined action according to a current situation, and the monitor software type indicates software that reads and shows data to a user as an interface between the user and a system.

2. The apparatus of claim 1, wherein the program code further comprises a user interface configured to control inputs and outputs between the developer and the feature selector, between the developer and the automatic code generator selector, and between the developer and the automatic code generator.

3. The apparatus of claim 1, wherein the controller controls architecture components corresponding to the development-subject software type received from the developer to be selected from among a plurality of software architecture components stored in the storage according to the software types.

4. The apparatus of claim 1, wherein the configurator fills an unimplemented part of software skeleton code of the architecture components of the development-subject software with the generated automatically generated code.

5. The apparatus of claim 1, wherein the requirements vary according to the automatic code generator corresponding to the development-subject software type.

6. A method for developing software performed in a software development apparatus, comprising:

selecting a feature corresponding to development-subject software received from a developer from a feature model created by analyzing features of multiple software belonging to a software product line, and generating a feature list;

determining an automatic code generator corresponding to at least one development-subject software type received from the developer;

selecting architecture components of the development-subject software using the at least one development-subject software type, and generating automatically generated code on the basis of the selected architecture components and requirements of the determined automatic code generator received from the developer;

modifying the automatically generated code and code of the architecture components on the basis of the generated feature list, and outputting configured code;

connecting a part calling a library of a domain in the configured code with a part calling an actual domain library, and generating final generation code; and controlling the automatic code generator corresponding to the development-subject software type received from the developer to be selected from among a plurality of previously developed automatic code generators stored according to software types, wherein the at least one development-subject software type includes at least one of a data manager software type, a data converter software type, a data distributor software type, a controller software type, and a monitor software type, wherein the feature model is created by analyzing commonality and variability of the multiple software belonging to the software product line in terms of features, wherein controlling the automatic code generator includes controlling the part calling the actual domain library which is connected with the part calling the library of the domain in the configured code to be selected from among libraries stored according to the software types, and wherein the data manager software type indicates software that stores and manages data, receives requests for data read, write, and deletion from outside, accesses a database to process the received requests, and performs processes for the received requests, the data converter software type indicates software that converts data received from a data sender into other data values according to a data transformation rule, the data distributor software type indicates software that transmits data received from a data sender to a data receiver according to a data distribution rule, the controller software type indicates software that manages a state of a system, and carries out a predetermined action according to a current situation, and the monitor software type indicates software that reads and shows data to a user as an interface between the user and a system.

7. The method of claim 6, further comprising separately storing the plurality of previously developed automatic code generators, a plurality of software architecture components, and libraries used in a software domain according to software types.

8. The method of claim 6, wherein controlling the automatic code generator includes controlling architecture components corresponding to the development-subject software type received from the developer to be selected from among a plurality of software architecture components stored according to the software types.

9. The method of claim 6, wherein generating the automatically generated code includes filling an unimplemented part of software skeleton code of the architecture components of the development-subject software with the generated automatically generated code.

10. The method of claim 6, wherein the requirements vary according to the automatic code generator corresponding to the development-subject software type.

* * * * *